United States Patent
Misra et al.

(10) Patent No.: US 10,015,120 B2
(45) Date of Patent: Jul. 3, 2018

(54) PROVIDING MESSAGE DELIVERY SERVICES BETWEEN REQUESTORS AND PROVIDERS

(71) Applicant: Oracle International Corporation, Redwood Shores, CA (US)

(72) Inventors: Srimant Misra, Bangalore (IN); Amit Jhunjhunwala, Bangalore (IN); Satish Duggana, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 248 days.

(21) Appl. No.: 14/668,448

(22) Filed: Mar. 25, 2015

(65) Prior Publication Data
US 2016/0285792 A1  Sep. 29, 2016

(51) Int. Cl.
| G06F 15/16 | (2006.01) |
|---|---|
| H04L 12/58 | (2006.01) |
| G06F 17/30 | (2006.01) |
| H04L 29/06 | (2006.01) |
| H04L 29/08 | (2006.01) |
| H04L 29/14 | (2006.01) |

(52) U.S. Cl.
CPC ........ *H04L 51/046* (2013.01); *G06F 17/3087* (2013.01); *H04L 51/14* (2013.01); *H04L 67/1025* (2013.01); *H04L 69/00* (2013.01); *H04L 69/40* (2013.01)

(58) Field of Classification Search
CPC ..... H04L 67/1025; H04L 69/00; H04L 69/40; G06F 17/30424; G06F 17/3087

USPC ............... 709/201, 206; 714/4.11; 705/14.71
See application file for complete search history.

(56) References Cited

U.S. PATENT DOCUMENTS

| 5,699,500 A | * | 12/1997 | Dasgupta | G06F 9/52 714/1 |
|---|---|---|---|---|
| 2013/0018960 A1 | * | 1/2013 | Knysz | G06Q 50/01 709/204 |
| 2013/0066940 A1 | * | 3/2013 | Shao | H04L 67/1025 709/201 |
| 2013/0268375 A1 | * | 10/2013 | Isbister | G06F 17/30424 705/14.71 |
| 2015/0169419 A1 | * | 6/2015 | Carney | H04L 69/00 714/4.11 |

OTHER PUBLICATIONS

"Oracle® Fusion Middleware Developing Services with Oracle Service Bus," (Jul. 2014), 41 pages.

* cited by examiner

*Primary Examiner* — Kyung H Shin
(74) *Attorney, Agent, or Firm* — Kilpatrick Townsend & Stockton LLP

(57) ABSTRACT

An intermediary messaging system is provided that facilitates exchange of information between service requestor and service providers. In an embodiment, the intermediary messaging system is configured to receive a request from a client, determine one or more target services for servicing the request, communicate information regarding the request to the identified target services, and communicate responses from the target services back to the client. In certain embodiments, the intermediary messaging service enables a single request received from the client to be translated to multiple requests and to possibly multiple target services without the client having to make multiple requests.

21 Claims, 14 Drawing Sheets

PROVIDING MESSAGE DELIVERY SERVICES BETWEEN REQUESTORS AND PROVIDERS

BACKGROUND OF THE INVENTION

The present disclosure relates to computer systems and software, and more particularly to techniques for facilitating information exchange between service requestors and service providers.

Information exchange between service requestors and service providers is typically based on a synchronous or asynchronous mode of interaction in which a service requestor or client sends a message to a service provider and either receives an immediate reply from the service provider or waits until a certain period of time to receive a reply from the service provider. The client then typically makes another request to receive additional information from the service provider.

In certain situations, users may wish to view this information as soon as it becomes available. There is a lot of processing that needs to be performed to make this information available to users. As such, improved ways for providing this information to users continues to be a priority.

BRIEF SUMMARY OF THE INVENTION

Techniques are provided (e.g., a method, a system, non-transitory computer-readable medium storing code or instructions executable by one or more processors) for facilitating information exchange between service requesters and service providers. In certain embodiments, an intermediary messaging system is provided that facilitates exchange of information between one or more clients and one or more target services provided by the service providers.

In certain embodiments, an intermediary messaging system is provided that is configured to receive a request from a client, determine one or more target services for servicing the request, communicate information regarding the request to the identified target services, and communicate responses from the target services back to the client. In certain embodiments, the intermediary messaging service enables a single request received from the client to be translated to multiple requests and to possibly multiple target services without the client having to make multiple requests.

In accordance with some aspects, the intermediary messaging system may be configured to receive a single request from a client. For instance, the client may be a client device within the organization and/or a program or application executing on the client device such as a web browser, a proprietary client application, and the like. Upon receiving the request, the intermediary messaging service may be configured to identify a set of target services for servicing the request. The identified set of target services may, for example, include services that provide computing resources such as, but not limited to, data storage, data access, data management, electronic content performance management, and the like to users on the client devices. The intermediary messaging system may then be configured to receive a first response to the request from the set of one or more target services at a first time and transmit the first response to the client. In some embodiments, the intermediary messaging service may be configured to receive a second response to the request at a second time from the set of one or more target services and transmit the second response to the client after the first response has been transmitted. In some examples, the second time may be different from and after the first time.

In accordance with some aspects, the intermediary messaging system may be configured to determine whether a session of an application executing on the client has ended and in response to determining that the session has not ended, wait for a third response to the request to be received from the set of one or more target services.

In accordance with some aspects, the intermediary messaging system may be configured to receive the first response from a first target service in the set of one or more target services and receive the second response from a second target service in the set of one or more target services. In some examples, the second target service may be different from the first target service. In other examples, the intermediary messaging system may be configured to receive the first response and the second response from the same target service in the set of one or more target services.

In accordance with some aspects, the intermediary messaging system may be configured to establish a connection using a Websocket protocol between the client and the intermediary messaging system. The intermediary messaging system may be configured to receive the request from the client using the connection and transmit the first response to the client using the connection.

In accordance with some aspects, the intermediary messaging system may be configured to receive, at a third time, a third response to the request from the first target service. In some examples, the third time may be different from and after the first time. The intermediary messaging system may then be configured to transmit the third response to the client.

In accordance with some aspects, the intermediary messaging system may be configured to receive, at a fourth time, a fourth response to the request from the second target service. In some examples, the fourth time may be different from and after the second time. The intermediary messaging system may then be configured to transmit, after the second response has been transmitted to the client, the fourth response to the client.

In accordance with some aspects, the intermediary messaging system may be configured to transmit a first backend request to the first target service, receive the first response in response to the first backend request and receive the third response in response to the first backend request.

In accordance with some aspects, the intermediary messaging system may be configured to transmit a first backend request to a first target service of the set of one or more targets services, receive the first response in response to the first backend request, transmit after receiving the first response, a second backend request to the first target service and receive the second response in response to the second backend request.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

In accordance with some aspects, an intermediary messaging system is disclosed that provides intermediary messaging services between one or more clients and one or more target services. In some examples, the intermediary messaging system may be configured to receive a single request from a client. For instance, the request may include a request to view information related to a list of fulfillment orders in an organization. Upon receiving the request, in some embodiments, the intermediary messaging system may be configured to identify a single target service for servicing the request. The intermediary messaging system may then be configured to transmit one or more backend requests to the identified target service. In some embodiments, the intermediary messaging system may then be configured to receive multiple responses periodically from the target service and provide the multiple responses to the client. For instance, if the client requests for a status of fulfillment orders, the multiple responses that are periodically sent back to the client by the intermediary messaging system may include updated status information (e.g., status information as of the time of the response) regarding the fulfillment orders. In some examples, the status information may be displayed via a browser application executing on the client. In some examples, the displayed status may be continuously updated with each response received from the intermediary messaging system. In this manner, intermediary messaging system is capable of sending multiple responses to the client in response to a single request received from the client, without the user and/or client having to generate multiple requests to view the updates.

In accordance with some aspects, the intermediary messaging system may be configured to receive a single request from a client and identify multiple target services for servicing the request. The intermediary messaging system may then be configured to translate the single request into multiple backend requests and transmit the multiple backend requests periodically to the multiple target services. The intermediary system may then be configured to receive multiple responses periodically from the multiple target services and provide the multiple responses to the client. The manner in which intermediary messaging system may be configured to process requests from clients and target services is discussed in detail below.

Figure 1:
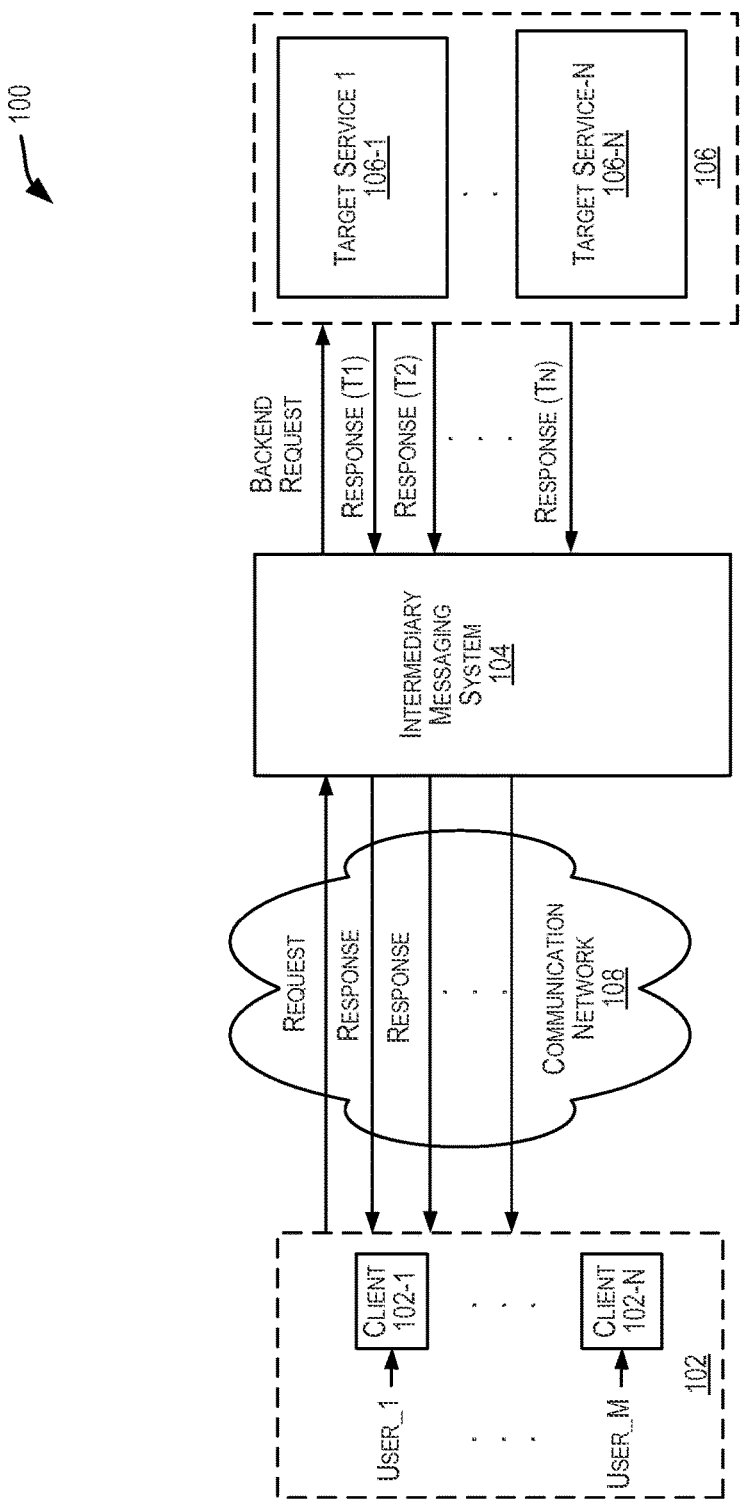
FIG. 1 illustrates an example block diagram of a computing environment in accordance with certain embodiments of the present invention.

FIG. 1 illustrates an example block diagram of a computing environment 100 in accordance with certain embodiments of the present invention. As shown, computing environment 100 includes one or more clients 102(1)-102(N) (collectively, clients 102) communicatively coupled to an intermediary messaging system 104 providing intermediary messaging services via a communication network 108. Intermediary messaging system 104 is also communicatively coupled with one or more target services such as target service 106(1) . . . 106(N) (collectively, target services 106). While not shown in FIG. 1, intermediary messaging system 104 may be communicatively coupled to the target services using one or more communication networks. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

Clients 102 may include client devices, which may be of various different types, including, but not limited to, a personal computer, a desktop, a mobile or handheld device such as a laptop, a mobile phone, a tablet, etc., and other types of devices. Clients 102 may also include programs or applications executing on client devices. For example, a client 102 may be a web browser, a proprietary client application, or some other application executing on client devices.

Communication network 108 facilitates communications between one or more clients 102 and intermediary messaging system 104. Communication network 108 can be of various types and can include one or more communication networks. For example, communication network 108 can include, without limitation, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as WebSockets that provide a full-duplex communication channel over a single TCP connection, IEEE 802.XX suite of protocols, TCP/IP, IPX, SAN, AppleTalk, Bluetooth, and other protocols.

In general, communication network 108 may include any communication network or infrastructure that facilitates communications between one or more clients such as clients 102 and message delivery system 104.

In some embodiments, intermediary messaging system 104 may be configured to receive a request from one or more clients 102. There are various ways in which a request may be generated by a client 102. In one instance, a request may be generated as a result of a user's (e.g., User_1) interactions with client 102. For example, a user may interact with an application executed by client 102 and the request may be generated as a result of that interaction. For example, a user may interact with a browser application executed by client 102 and the interaction may cause the browser application to generate a request. As another example, a user may log into an order management application for an organization on client 102 and request to view a list of fulfillment orders within the organization. This user request may cause the order management application to generate a request that is sent to intermediary messaging system 104.

There are various ways in which client 102 may communicate the request to intermediary messaging system 104. In one embodiment, the client may establish a communication channel with intermediary messaging system 104 and use a communication protocol to communicate the request to intermediary messaging system 104. For example, in one embodiment, client 102 may establish a WebSocket connection with intermediary messaging system 104 by sending a Websocket handshake request to intermediary messaging system 104. Intermediary messaging system 104 may be configured to receive the handshake request from client 102 and establish a full-duplex Websocket communication channel with client 102. Intermediary messaging system 104 may then be configured to receive the request from client 102 via the Websocket connection.

Upon receiving the request, intermediary messaging system 102 may be configured to identify a set of target services 106 for servicing the request. For example, if the request received from client 102 was a request to view a list of fulfillment orders, the target services may provide fulfillment order information related to orders dispatched within the organization, order status (packaged, in-transit, delivered and the like) information updates, information related to the dispatched quantity and/or total quantity of orders, the estimated time of delivery of orders, information about customer lead time (based on location and logistics) and the like. In some embodiments, intermediary messaging system 104 may then be configured to transmit a single backend request to the set of one or more target services. Intermediary messaging system 104 may be configured to receive a first response to the request from the set of one or more target services at a first time (T1) and transmit the first response to the client. In some embodiments, intermediary messaging system 104 may be configured to receive a second response to the request at a second time (T2) from the set of one or more target services and transmit the second response to the client after the first response has been transmitted. In some examples, the second time (T2) may be different from and after the first time (T1). In some examples, the multiple responses that are periodically sent back to the client by the intermediary messaging system may include updated status information (e.g., status information as of the time of the response) regarding the status of fulfillment orders. In this manner, intermediary messaging system 104 may be configured to transmit multiple responses to client 102 in response to a single request received from the client without the user and/or client having to generate multiple requests to view the updates. In some examples, the status information may be displayed by client 102 via a browser application executing on the client. In some examples, the displayed status may be continuously updated by client 102 with each response received from the intermediary messaging system.

In some embodiments, target services 106 may be implemented by one or more target systems. Examples of a target system include, without limitation, a mobile phone, a smart phone, a kiosk, a personal digital assistant (PDA), a laptop computer, a desktop computer, a server computer, a thin-client device, a tablet PC, and the like.

Figure 2:
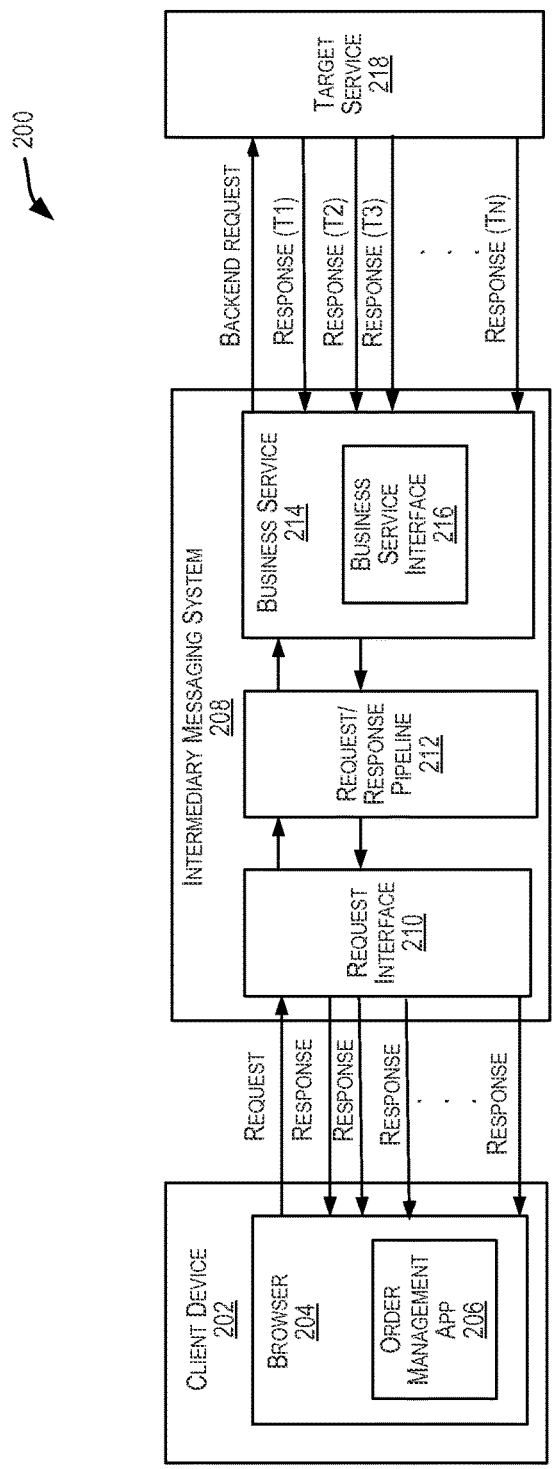
FIG. 2 depicts a simplified high-level diagram of an environment 200 of an intermediary messaging system according an embodiment of the present invention.

FIG. 2 depicts a simplified high-level diagram of an environment 200 of an intermediary messaging system according an embodiment of the present invention. Intermediary messaging system 208 may be the same or similar to intermediary messaging system 104 described in FIG. 1. In the embodiment depicted in FIG. 2, intermediary messaging system 208 includes a request interface 210, a request/response pipeline 212 and a business service component 214. In an embodiment, request interface 210, request/response pipeline 212 and business service component 214 may be implemented as general purpose computers, specialized server computers, server farms, server clusters, software components executed by one or more processors or any other appropriate arrangement and/or combination. The various components of intermediary messaging system 208 depicted in FIG. 2 are meant for illustrative purposes only and are not intended to limit the scope of embodiments of the present invention. Alternative embodiments may include more or fewer components than those shown in FIG. 2.

In accordance with at least some embodiments, intermediary messaging system 208 may be configured to receive a request from client device 202. For instance, a user may log into an order management application 206 via a browser application 204 on client device 202 and request to view a list of fulfillment orders within an organization. This user request may cause the order management application to generate a request that is sent to intermediary messaging system 208.

In some examples, browser application 204 on client device 202 may be configured to communicate the request to intermediary messaging system 208 by establishing a communication channel with request interface 210 in intermediary messaging system 208 and using a communication protocol to communicate the request to request interface 210. The communication protocol used by client device 202 may include, for example, a Hyper Text Transfer Protocol (HTTP), a Java Messaging Service (JMS) protocol, a FTP (File Transfer Protocol) and the like. In an example, client device 202 may establish a WebSocket connection with intermediary messaging system 104 by sending a Websocket handshake request to request interface 210. Request interface 210 may be configured to receive the handshake request from client device 202 and establish a full-duplex Websocket communication channel with client device 202. Upon successfully establishing a Websocket connection, request interface 210 may be configured to receive the incoming request from client device 202 via the Websocket connection and transmit the request to a request/response pipeline 212.

Request/response pipeline 212 may be configured to accept the incoming request from request interface 210 and route the request to an appropriate business service interface (e.g., 216) in business service component 214. In some embodiments, request/response pipeline 212 may be configured to specify a request path and/or a response path of the message flow for service requests and responses. Business service interface 216 may be configured to identify one or more target services for servicing the request. In some embodiments, business service component 214 may be configured to provide definitions of target services such as enterprise services and database services implemented by the target systems. In the example depicted in FIG. 2, business service interface 216 identifies a single target service 218 for servicing the request. Business service interface 216 may then be configured to transmit a single backend request to target service 218. In some embodiments, business service interface 216 may be configured to transform the incoming request from request/response pipeline 212 into a format understood by target service 218, prior to transmitting the backend request to target service 218.

In some examples, business service interface 216 may be configured to communicate the backend request to target service 218 by establishing a communication channel with target service 218 and using a communication protocol to communicate the backend request to target service 218. In some examples, the communication connection and protocol used by business service interface 216 may be the same as or different from the communication connection and protocol used for communications between the client device 202 and request interface 210. For instance, business service interface 214 may establish a Web Socket connection with target service 218 by send a Websocket handshake request to target service 218. Target service 218 may be configured to receive the handshake request from business service interface 216 and establish a full-duplex Websocket communication channel with business service interface 216. Further, in some embodiments, the communication connection and protocol used by the intermediary messaging system for communicating with one target service may be the same as or different from a communication connection and protocol used for communications between the intermediary messaging system and a different target service.

Target service 218 may be configured to provide multiple responses to business service interface 216 in response to the single backend request communicated from the business service interface to the target service. In some embodiments, these responses may be provided by target service 218 periodically in a serialized manner over a period of time. For example, target service 218 may be configured to provide a first response at time T1, a second response at time T2 where T2 is after T1, a third response at time T3 where T3 is after T2, a fourth response at time T4 where T4 is after T3, and so on. The period of time between the responses may be fixed or variable and may be configurable. In this manner, in response to a single request, target service 218 is capable of sending multiple responses back to intermediary messaging system 208 over a period of time. In some embodiments, the target service 218 may be capable of sending the multiple responses to intermediary messaging system 208 until the end of a session of the order management application executing on the client device. In other examples, the target service 218 may be capable of sending the multiple responses to intermediary messaging system 208 for a period of time that the user is logged into an application on the client device, or for a preconfigured threshold of time. In some examples, the multiple responses may include updated status information (e.g., status information as of the time of the response) regarding the status of fulfillment orders.

Business service interface 216 is configured to receive the multiple responses (e.g., a first response, a second response, a third response and so on) from target service 218 and communicate the multiple responses to request interface 210 via request/response pipeline 212. In some embodiments, request/response pipeline 212 may be configured to invoke a response pipeline for each of the responses it receives from business service interface 216. Request/response pipeline 212 may then be configured to transmit the received responses to request interface 210.

Request interface 210 may be configured to receive the first response from request/response pipeline 212 and communicate the first response to client device 202. In certain embodiments, request interface 210 may be configured to receive the second response from business service interface 216 via request/response pipeline 212 and communicate the second response to the client device after the first response has been communicated. In this manner, request interface 210 may be configured to transmit multiple responses to client 102 in response to a single request received from the client without the user and/or client having to generate multiple requests to view the updates. In some examples, the status information may be displayed by client device 202 via a browser application executing on the client. In some examples, the displayed status may be continuously updated by client device 202 with each response received from the request interface.

In the embodiment depicted in FIG. 2, upon receiving a request from client device 202 and identifying a target service for the request, intermediary messaging system 208 sends a single backend request to the identified target service (e.g., 218). The target service is capable of sending multiple responses to intermediary messaging system 208 in response to the single backend request. However, not all target services may be capable of sending multiple responses in response to single backend request.

Figure 3:
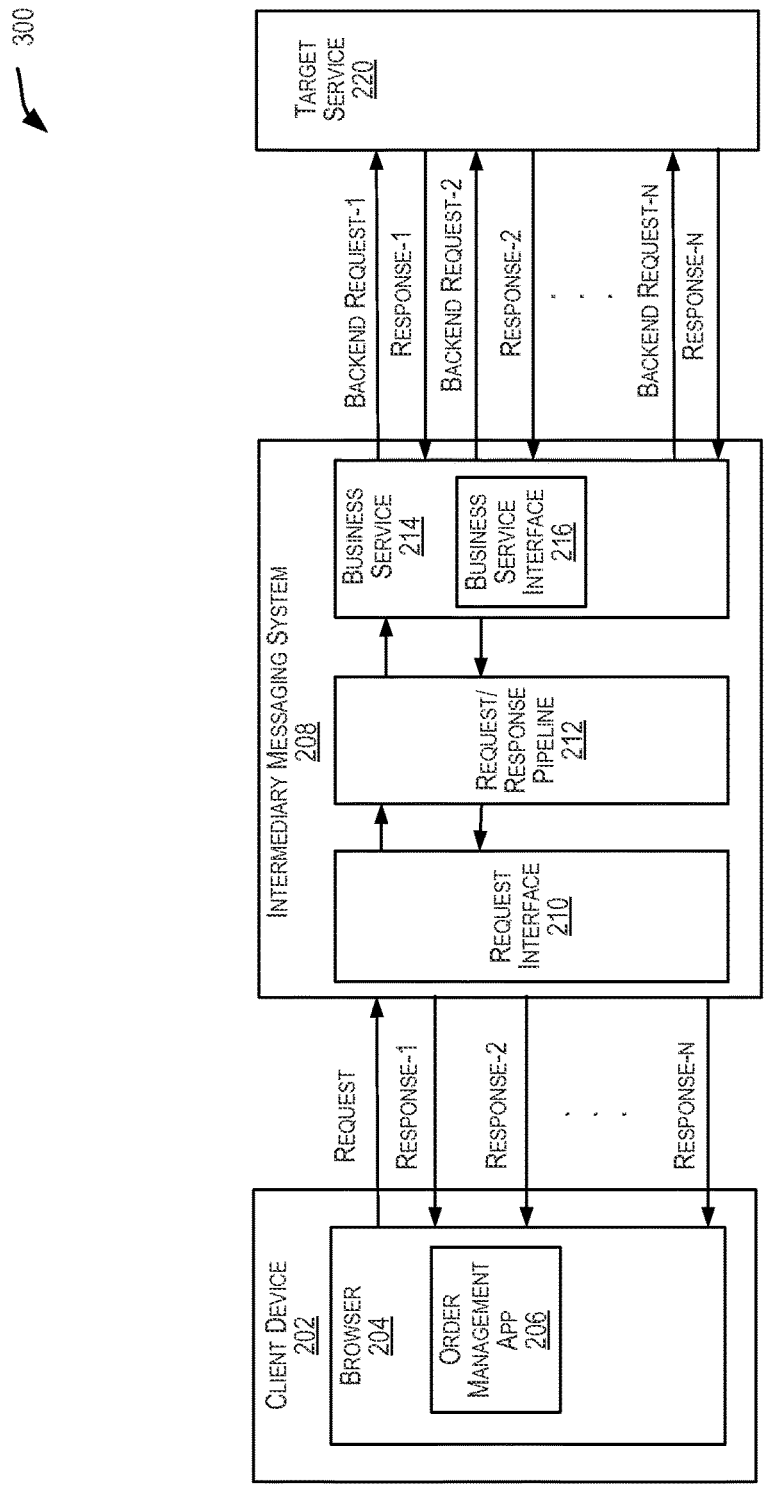
FIG. 3 depicts a simplified high-level diagram of an environment 300 that illustrates the manner in which an intermediary messaging system processes requests and/or responses between client devices and target services, in accordance with another embodiment of the present invention.

FIG. 3 depicts a simplified high-level diagram of an environment 300 that illustrates the manner in which an intermediary messaging system processes requests and/or responses between client devices and target services, in accordance with another embodiment of the present invention. In the embodiment shown in FIG. 3, target service 220 is capable of sending only one response in response to a backend request received from intermediary messaging system 208. This is in contrast to target service 218 depicted in FIG. 2 where the target service was capable of sending multiple periodic responses in response to a single backend request received from intermediary messaging system 208. As a result of this limitation on the capabilities of target service 220, in some embodiments, intermediary messaging system 208 may be configured to generate and send multiple backend requests to target service 220 and process responses received from the target service. In one embodiment, when intermediary messaging system 208 detects that the target service is only capable of sending a single response to a single backend request, intermediary messaging system 208 is configured to generate a first backend request and communicate it to target service 220, wait for and receive a first response from target service 220 in response to the first backend request, then generate and send a second backend request to target service 220, wait for and receive a second response from target service in response to the second backend request, then generate and send a third backend request to target service 220, and so on.

In this manner, intermediary messaging system manages the generation of the multiple requests to the target service and processing the receipt of responses from the target service. The time delay between the receipt of a response from the target service and the generation of the next backend request may be configurable. Responses received by intermediary messaging system 208 from target service 220 may be processed and sent to the requesting client in a manner similar to the embodiment depicted in FIG. 2 and described above. For example, business service interface 216 is configured to receive the multiple responses (e.g., a first response, a second response, a third response and so on) from target service 220 and communicate the multiple responses to request interface 210 via request/response pipeline 212. Request/response pipeline 212 may then be configured to transmit the received responses to request interface 210. Request interface 210 may then be configured to receive the responses from request/response pipeline 212 and communicate the responses to client device 202. The user may view the multiple responses via browser application 204 on client device 202.

In the embodiments depicted in FIGS. 2 and 3, intermediary messaging system 208 identified a single target service for servicing a request received from the client. In alternative embodiments, intermediary messaging system 208 may identify multiple target services to service the request received from the client.

Figure 4:
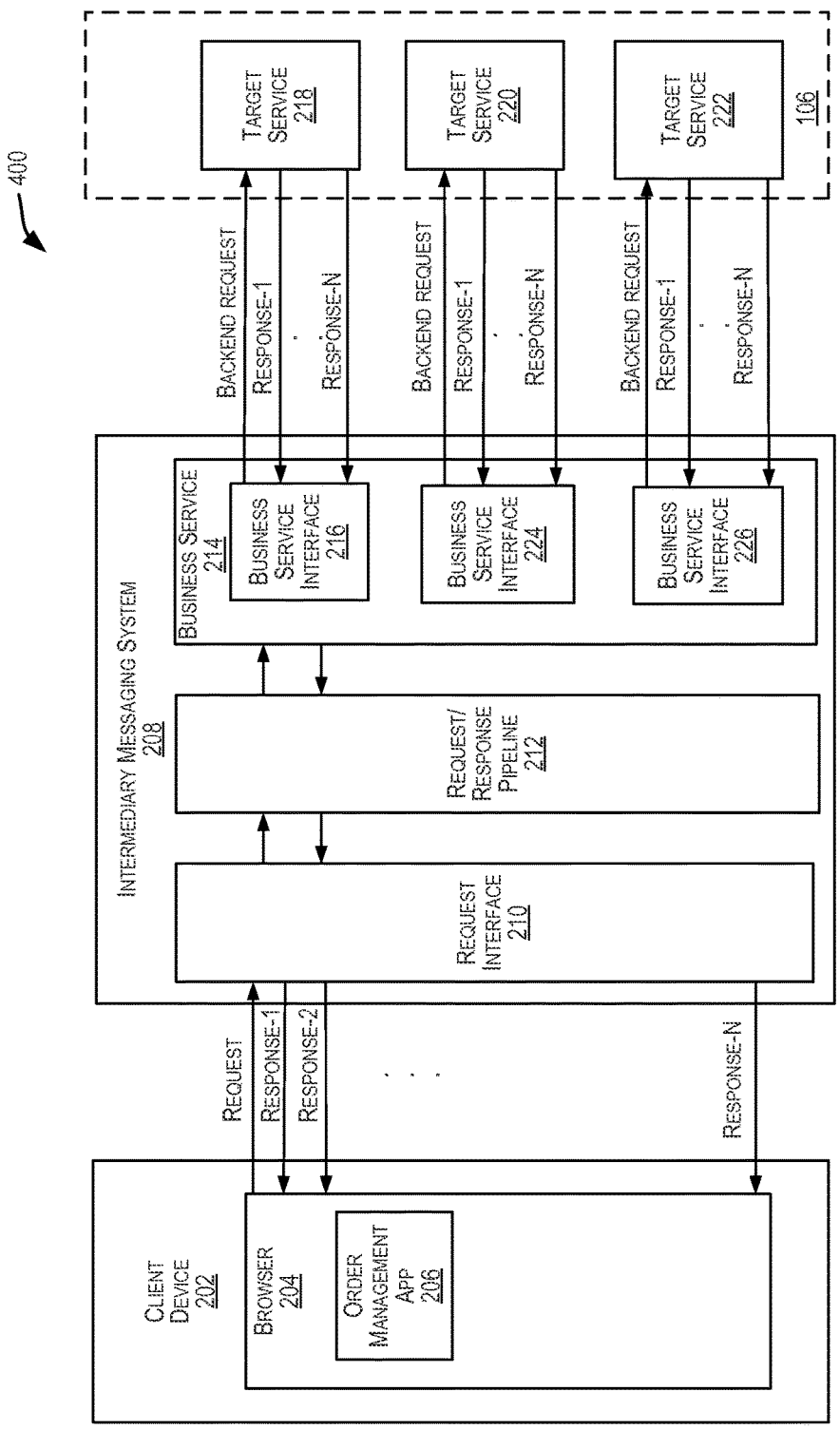
FIG. 4 depicts a simplified high-level diagram of an environment 400 that illustrates the manner in which an intermediary messaging system processes requests and/or responses between client devices and target services, in accordance with another embodiment of the present invention.

FIG. 4 depicts a simplified high-level diagram of an environment 400 that illustrates the manner in which an intermediary messaging system processes requests and/or responses between client devices and target services, in accordance with another embodiment of the present invention. In the embodiment shown in FIG. 4, request interface 210 receives a request from client device 202 by establishing a communication channel with client device 202 as discussed above. Request interface 210 then transmits the request to request/response pipeline 212. Request/response pipeline 212 accepts the incoming request from request interface 210 and routes the request to one or more business service interfaces (e.g., 216, 224 and 226) in business service component 214. Each of the business service interfaces 216, 224 and 226 then transmit individual backend requests to each of the target services 218, 220 and 222. In the example shown in FIG. 4, business service interface 216 communicates a first backend request to a first target service 218 by establishing a communication channel with target service 218, business service interface 224 communicates a second backend request to a second target service 220 by establishing a communication channel with target service 220 and business service interface 226 communicates a third backend request to a third target service 222 by establishing a communication channel with target service 222. In certain embodiments, business service interfaces 216, 224 and 226 may transmit the backend requests in parallel to each other or in a serialized manner.

In the embodiment shown in FIG. 4, each of target services 218, 220 and 222 are capable of sending multiple responses to the individual business service interfaces 216, 224 and 226 respectively in response to individual backend requests communicated from each of the business service interfaces 216, 224 and 226 to target services 218, 220 and 222. In some embodiments, these responses may be provided by target services 218, 220 and 222 periodically in a serialized manner over a period of time. For example, target services 218, 220 and 222 may each be configured to provide a first response at time T1, a second response at time T2 where T2 is after T1, a third response at time T3 where T3 is after T2, a fourth response at time T4 where T4 is after T3, and so on. The period of time between the responses may be fixed or variable and may be configurable.

Business service interfaces 216, 224 and 226 may be configured to receive the multiple responses (e.g., a first response, a second response, a third response and so on) from each of the target services 218, 220 and 222 and communicate the multiple responses to request interface 210 via request/response pipeline 212. In some embodiments, request/response pipeline 212 may be configured to invoke a separate response pipeline for the responses it receives from each of the business service interfaces 216, 224 and 226. Request/response pipeline 212 may then be configured to transmit the received responses to request interface 210. Request interface 210 may be configured to receive the responses from request/response pipeline 212 and communicate the responses to client device 202.

In some examples, the multiple responses received by client device 202 may include updated status information (e.g., status information as of the time of the response) regarding the user's request. In some embodiments, the status information may be displayed by client device 202 via a browser application 204 executing on the client. In some examples, the displayed status may be continuously updated by client device 202 with each response received from the intermediary messaging system.

In the embodiment depicted in FIG. 4, upon receiving a request from client device 202 and identifying multiple target services for servicing the request, intermediary messaging system 208 sends a single backend request to each of the identified target services (e.g., 218, 220 and 222). Each of the target services is capable of sending multiple responses to intermediary messaging system 208 in response to the single backend request. However, as discussed above, not all target services may be capable of sending multiple responses in response to single backend request. Thus, in some embodiments, and as depicted in FIG. 5, intermediary messaging system 208 may be configured to identify multiple target services for servicing a request and generate and send multiple backend requests to the identified target services and process responses received from the target services.

Figure 5:
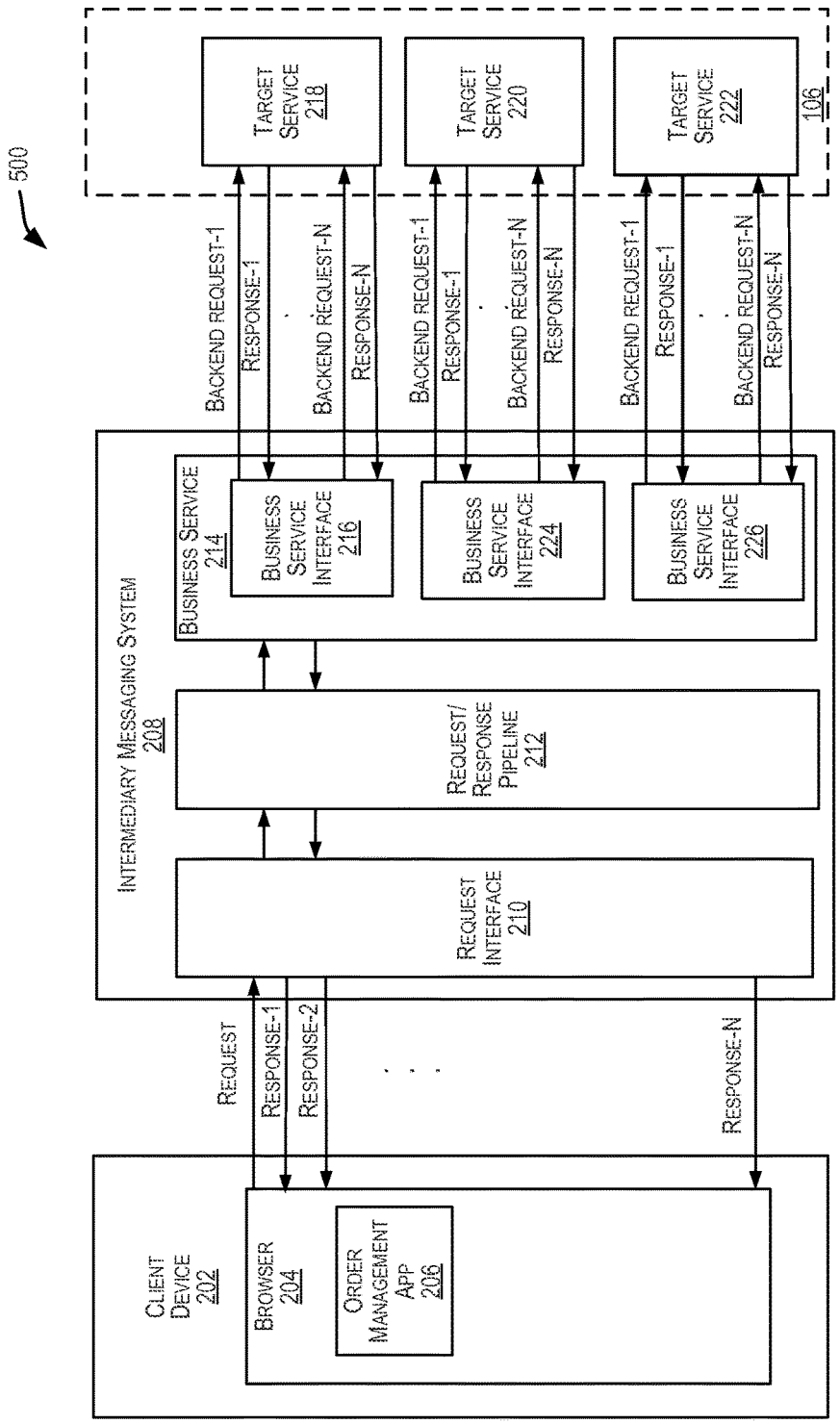
FIG. 5 depicts a simplified high-level diagram of an environment 500 that illustrates the manner in which an intermediary messaging system processes requests and/or responses between client devices and target services, in accordance with another embodiment of the present invention.

FIG. 5 depicts a simplified high-level diagram of an environment 500 that illustrates the manner in which an intermediary messaging system processes requests and/or responses between client devices and target services, in accordance with another embodiment of the present invention. In the embodiment shown in FIG. 5, intermediary messaging system 208 may be configured to detect that a particular target service (e.g., 218, 220 or 222) is only capable of sending a single response to a single backend request and generate and send individual multiple backend requests to each of the target services 218, 220 and 222 and process responses received from the target services.

For instance, business service interface 216 in intermediary messaging system 208 may be configured to generate a first backend request and communicate it to target service 218, wait for and receive a first response from target service 218 in response to the first backend request, then generate and send a second backend request to target service 220, wait for and receive a second response from target service in response to the second backend request, then generate and send a third backend request to target service 220, and so on. Similarly, business service interfaces 224 and 226 may be configured to second and third multiple backend requests respectively and communicate the backend requests to target services 220 and 222. The second and third multiple backend requests may be sent in parallel to or in a serialized manner after the first backend request.

Each of the target services 218, 220 and 222 are capable of sending multiple responses periodically to the individual business service interfaces 216, 224 and 226 respectively in response to the multiple individual backend requests communicated from each of the business service interfaces 216, 224 and 226 to target services 218, 220 and 222.

Business service interfaces 216, 224 and 226 may be configured to receive the multiple responses (e.g., a first response, a second response, a third response and so on) from each of the target services 218, 220 and 222 and communicate the multiple responses to request interface 210 via request/response pipeline 212. In some embodiments, request/response pipeline 212 may be configured to invoke a separate response pipeline for each of the responses it receives from business service interfaces 216, 224 and 226. Request/response pipeline 212 may then be configured to transmit the received responses to request interface 210. Request interface 210 may be configured to receive the responses from request/response pipeline 212 and communicate the responses to client device 202.

In the embodiments depicted in FIGS. 2-5, the business service interfaces in business service component 214 were capable of identifying one or more target services for servicing a request from a client. In alternative embodiments shown in FIG. 6 and FIG. 7 below, request/response pipeline 212 may directly be configured to invoke the business service interfaces to identify the target services for servicing the request without routing the request to separate business service interfaces in a business service component.

Figure 6:
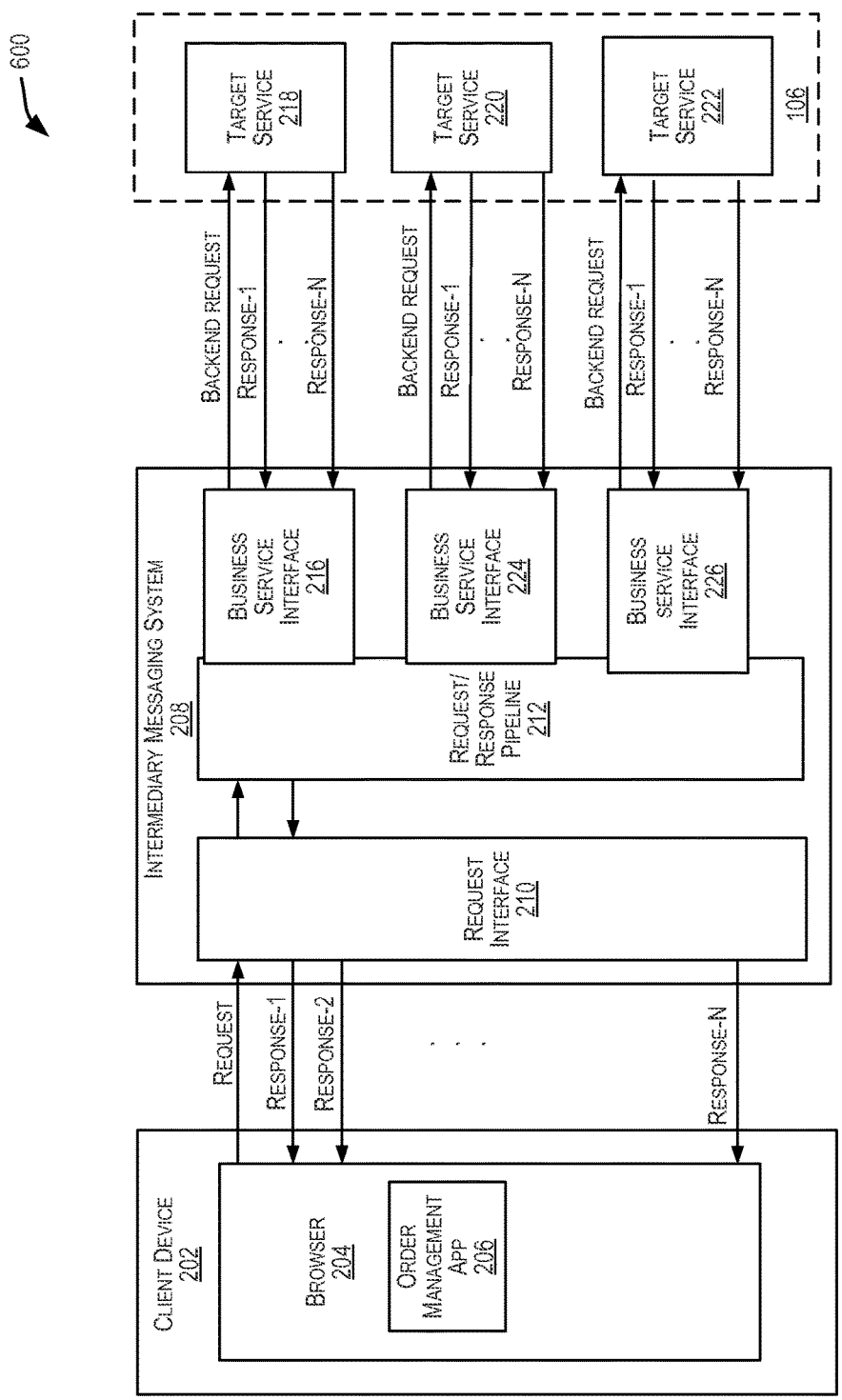
FIG. 6 depicts a simplified high-level diagram of an environment 600 that illustrates the manner in which an intermediary messaging system processes requests and/or responses between client devices and target services, in accordance with another embodiment of the present invention.

FIG. 6 depicts a simplified high-level diagram of an environment 600 that illustrates the manner in which an intermediary messaging system processes requests and/or responses between client devices and target services, in accordance with another embodiment of the present invention. In the embodiment shown in FIG. 6, request interface 210 receives a request from client device 202 and transmits the request to request/response pipeline 212. Request/response pipeline 212 then directly invokes one or more business service interfaces 216, 224 and 226 to identify one or more target services for servicing the request. Each of the business service interfaces 216, 224 and 226 then sends a single backend request to each of the identified target services (e.g., 218, 220 and 222). Each of the target services is capable of sending multiple responses to intermediary messaging system 208 in response to the single backend request.

In some embodiments, these responses may be provided by target services 218, 220 and 222 periodically in a serialized manner over a period of time. For example, target services 218, 220 and 222 may each be configured to provide a first response at time T1, a second response at time T2 where T2 is after T1, a third response at time T3 where T3 is after T2, a fourth response at time T4 where T4 is after T3, and so on. The period of time between the responses may be fixed or variable and may be configurable.

Request/response pipeline 212 may then be configured to directly receive the multiple responses (e.g., a first response, a second response, a third response and so on) from each of the target services 218, 220 and 222 via business service interfaces 216, 224 and 226 and communicate the multiple responses to request interface 210 via request/response pipeline 212. In some embodiments, request/response pipeline 212 may be configured to invoke a separate response pipeline for each of the responses it receives from each of the business service interfaces 216, 224 and 226. Request/response pipeline 212 may then be configured to transmit the received responses to request interface 210. Request interface 210 may be configured to receive the responses from request/response pipeline 212 and communicate the responses to client device 202.

In the embodiment depicted in FIG. 6, upon receiving a request from client device 202 and identifying multiple target services for servicing the request, request/response pipeline 212 may send a single backend request to each of the identified target services (e.g., 218, 220 and 222) by invoking business service interfaces 216, 224 and 226. Each of the target services is capable of sending multiple responses to the request/response pipeline in response to the single backend request. However, as discussed above, not all target services may be capable of sending multiple responses in response to single backend request. Thus, in some embodiments, and as depicted in FIG. 7, request/response pipeline 212 may be configured to identify multiple target services for servicing a request and generate and send multiple backend requests to the identified target services and process responses received from the target services as shown in FIG. 7.

Figure 7:
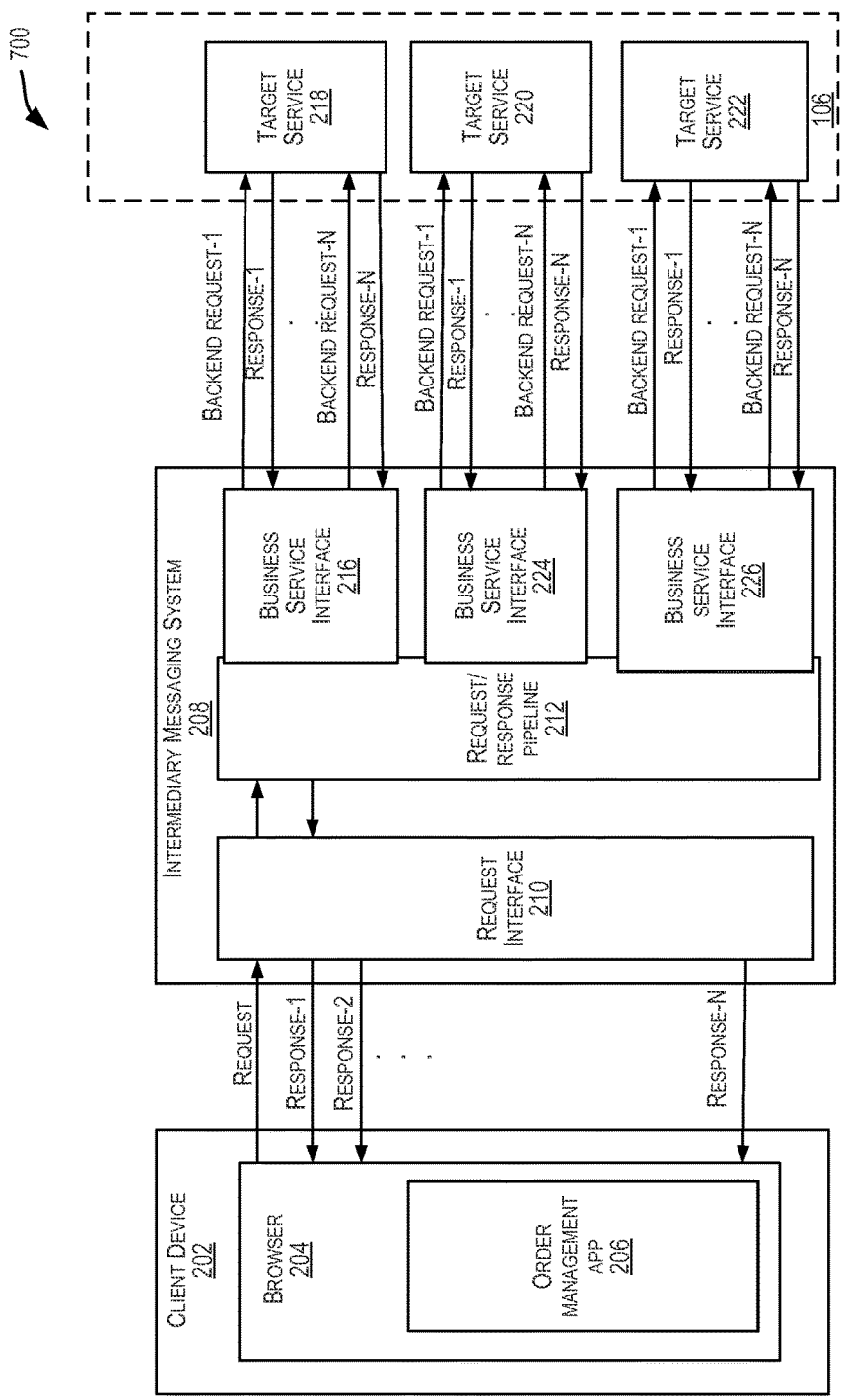
FIG. 7 depicts a simplified high-level diagram of an environment 700 that illustrates the manner in which an intermediary messaging system processes requests and/or responses between client devices and target services, in accordance with another embodiment of the present invention.

FIG. 7 depicts a simplified high-level diagram of an environment 700 that illustrates the manner in which an intermediary messaging system processes requests and/or responses between client devices and target services, in accordance with another embodiment of the present invention. In the embodiment shown in FIG. 7, request/response pipeline 212 may be configured to detect that a particular target service (e.g., 218, 220 or 222) is only capable of sending a single response to a single backend request, generate and send individual multiple backend requests to each of the target services 218, 220 and 222 and process responses received from the target services.

For instance, business service interface 222 in request/response pipeline 212 may be configured to generate a first backend request and communicate it to target service 218, wait for and receive a first response from target service 218 in response to the first backend request, then generate and send a second backend request to target service 220, wait for and receive a second response from target service in response to the second backend request, then generate and send a third backend request to target service 220, and so on. Similarly, business service interfaces 224 and 226 may be configured to second and third multiple backend requests respectively and communicate the backend requests to target services 220 and 222. The second and third multiple backend requests may be sent in parallel to or after the first backend request.

Each of the target services 218, 220 and 222 are capable of sending multiple responses periodically to the individual business service interfaces 216, 224 and 226 respectively in response to the multiple individual backend requests communicated from each of the business service interfaces 216, 224 and 226 to target services 218, 220 and 222.

Business service interfaces 216, 224 and 226 may be configured to receive the multiple responses (e.g., a first response, a second response, a third response and so on) from each of the target services 218, 220 and 222 and communicate the multiple responses to request interface 210. In some embodiments, request/response pipeline 212 may be configured to invoke a separate response pipeline for each of the responses it receives from business service interfaces 216, 224 and 226. Request/response pipeline 212 may then be configured to transmit the received responses to request interface 210. Request interface 210 may be configured to receive the multiple responses from request/response pipeline 212 and communicate the responses to client device 202.

FIGS. 8-11 illustrate example flow diagrams showing respective processes 800, 900, 1000 and 1100 of providing message delivery services according to certain embodiments of the present invention. These processes are illustrated as logical flow diagrams, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the intermediary messaging system (e.g., utilizing at least request interface 210, request/response pipeline 212 and business service component 216) shown in at least FIG. 2 (and others) may perform the processes 800, 900, 1000 and 1100 of FIGS. 8-11 respectively.

Figure 8:
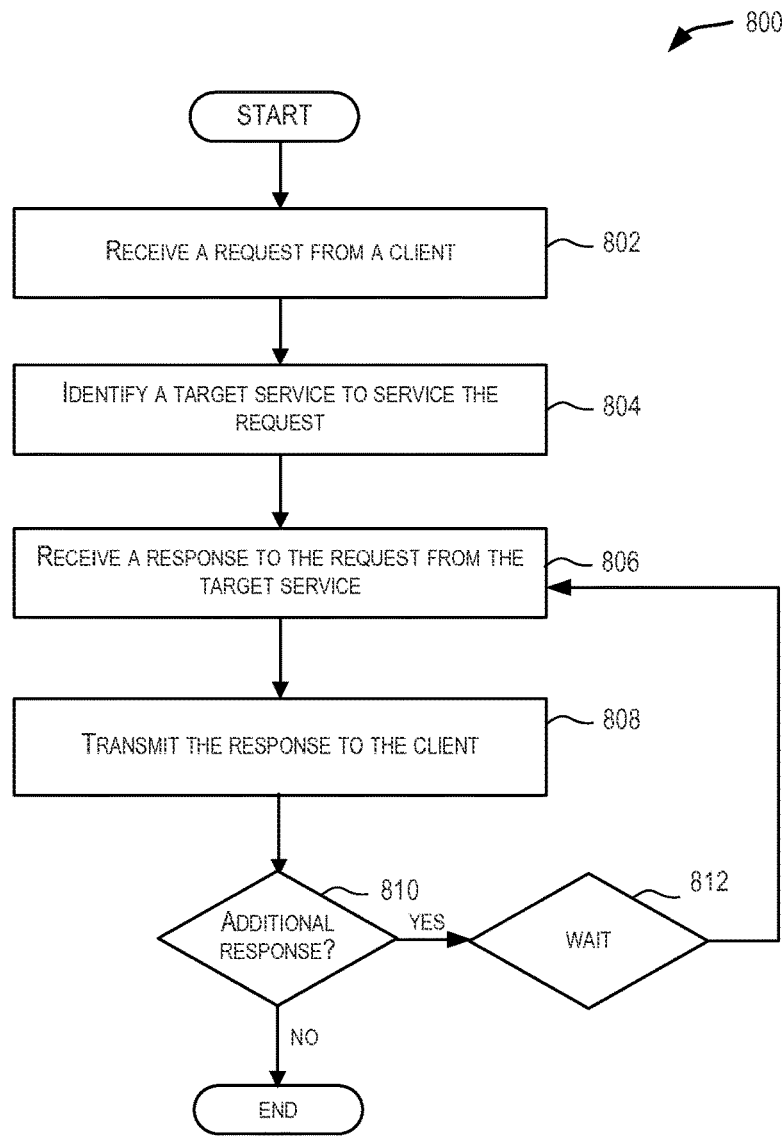
FIG. 8 illustrates a flow diagram of an example process 800 for providing message delivery services for users of an organization, described herein.

FIG. 8 illustrates a flow diagram of an example process 800 for providing message delivery services. The process at 800 may begin at 802 when a request is received by intermediary messaging system (e.g., 208) from a client (e.g., 202). For instance, the user may utilize an application on the client generate a request information and the resultant request may be communicated from the client to intermediary messaging system 208. At 804, a target service (e.g., 218) that can service the request is identified. At 806, intermediary messaging system 208 receives a response from the identified target service. At 808, intermediary messaging system transmits the response to the client. At 812, intermediary messaging system 208 determines if an additional response will be received from the identified target service. Various conditions may be utilized by the intermediary messaging system to determine whether an additional response is to be expected from the identified target service. These conditions may include for example, determining whether a session of an application executing on the client has ended, whether a preconfigured period of time determined by the intermediary messaging system has ended or whether the user as logged out of the client.

If it is determined that an additional response is to be expected, then intermediary messaging system may wait for a period of time 812 before receiving another response from the target system at 806. If it is determined that no additional response is to be expected, then in some embodiments, the process ends.

As shown in FIG. 8 and described above, intermediary messaging system 208 enables multiple responses may be communicated to the client in response to a single request received from the client. For example, during the first iteration of process 800 a first response may be received from the identified target service in 806 at time T1. During a second iteration of operations of 810, 812 and 806, a second response may be received from the identified target service at time T2, where T2 is after T1, with possible a delay of time between T1 and T2. During a third iteration of operations 810, 812 and 806, a third response may be received from the identified target service at time T3, where T3 is after T2, with possible a delay of time between T2 and T3, and so on.

Figure 9:
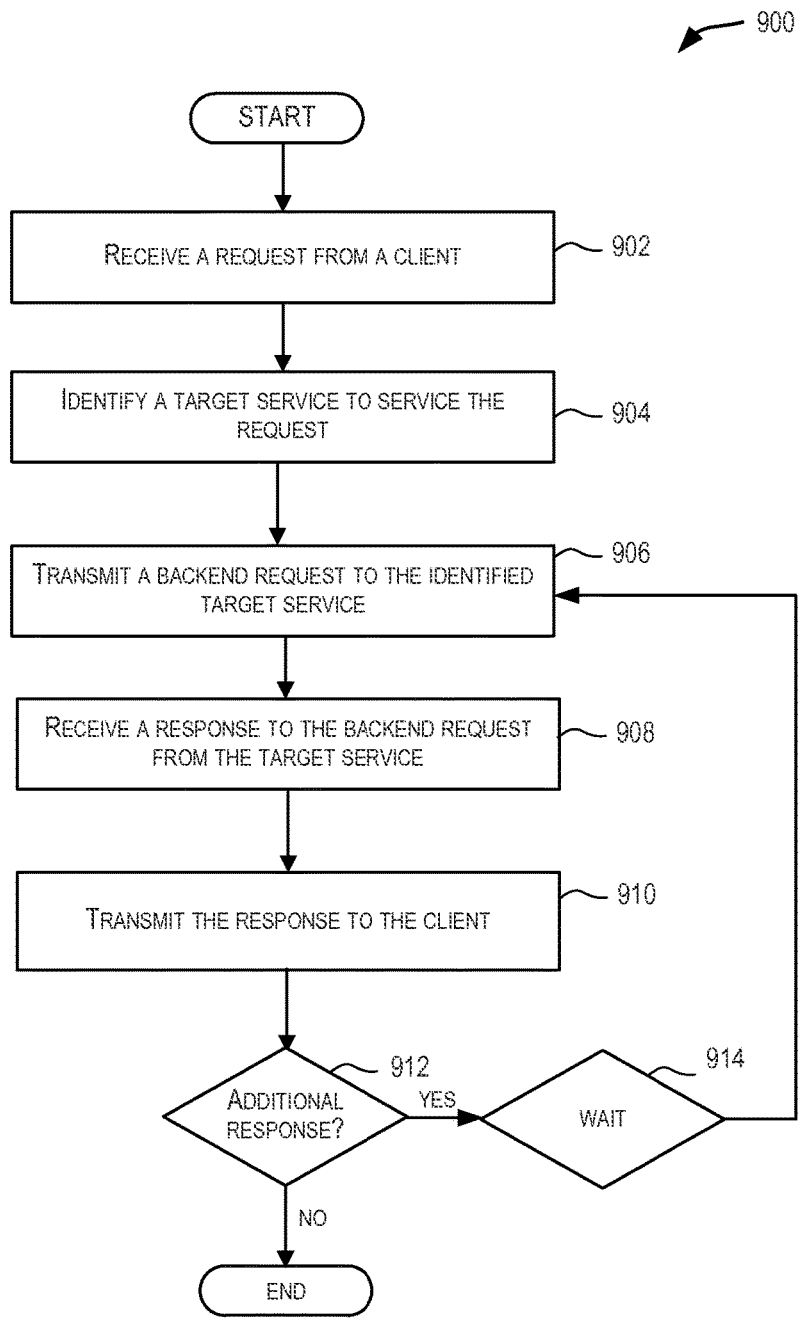
FIG. 9 illustrates a flow diagram of an example process 900 for providing message delivery services for users of an organization, described herein.

FIG. 9 illustrates a flow diagram of an example process 900 for providing message delivery services for users of an organization, described herein. The process at 900 may begin at 902 by receiving a request from a client. For instance, and as discussed above, the user may utilize an application on the client to generate a request. At 904, the intermediary messaging system may identify a target service for servicing the request. At 906, the intermediary messaging system may transmit a backend request to the identified target service. At 908, the intermediary messaging system may receive a response to the backend request from the identified target service. At 910, the intermediary messaging system may transmit the response to the client.

At 912, the intermediary messaging system determines if an additional response will be received from the identified target service. As discussed in relation to FIG. 8, various conditions may be utilized by the intermediary messaging system to determine whether an additional response is to be expected from the identified target service. If it is determined that an additional response is to be expected, then intermediary messaging system may wait for a period of time 914 before transmitting another backend request to the identified target service and receive another response from the target service at 908. If it is determined that no additional response is to be expected, then in some embodiments, the process ends.

As shown in FIG. 9 and described above, intermediary messaging system 208 enables multiple responses may be communicated to the client by transmitting multiple backend requests to the identified target service. For example, during the first iteration of process 900, a first response may be transmitted to the client in 910 at time T1. During a second iteration of operations of 912, 914, 906 and 908, a second backend request may be transmitted to the identified target service and a second response may be received from the identified target service at time T2, where T2 is after T1, with possible a delay of time between T1 and T2. During a third iteration of operations of 912, 914, 906 and 908, a third backend request may be sent to the identified target service and a third response may be received from the identified target service at time T3, where T3 is after T2, with possible a delay of time between T2 and T3, and so on.

Figure 10:
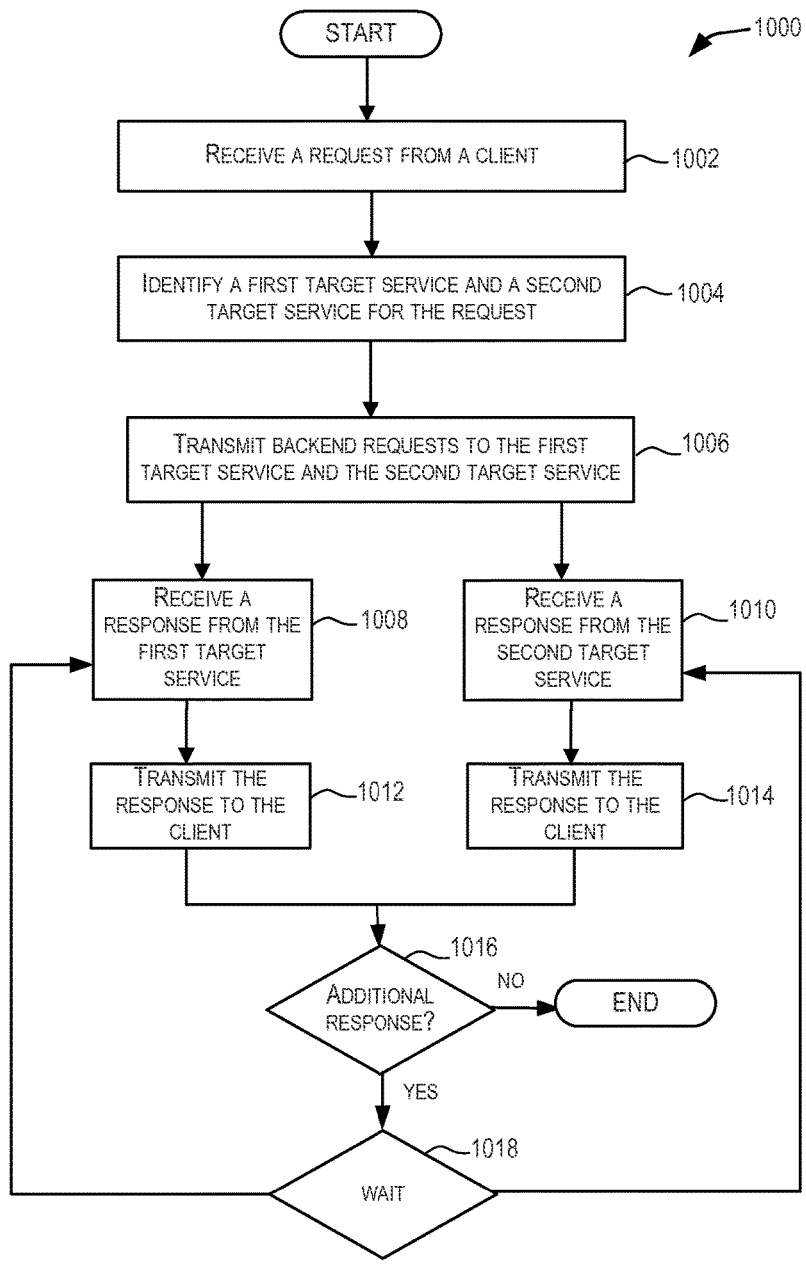
FIG. 10 illustrates a flow diagram of an example process 1000 for providing message delivery services for users of an organization, described herein.

FIG. 10 illustrates a flow diagram of an example process 1000 for providing message delivery services for users of an organization, described herein. The process at 1000 may begin at 1002 by receiving a request from a client. For instance, and as discussed above, the user may utilize an application on the client to generate a request. At 1004, the intermediary messaging system may identify a first target service and a second target service for servicing the request. At 1006, the intermediary messaging system may transmit backend requests to the first and second target services. At 1008, the intermediary messaging system may receive a response to the backend request from the first target service. At 1010, the intermediary messaging system may receive a response to the backend request from the second target service. The response from the second target service may be received in parallel to or after the response from the first target service. At 1012, the intermediary messaging system may transmit the response from the first target service to the client. At 1014, the intermediary messaging system may transmit the response from the second target service to the client.

At 1016, the intermediary messaging system determines if an additional response will be received from the first and/or second target service. As discussed above, various conditions may be utilized by the intermediary messaging system to determine whether an additional response is to be expected from the target services. If it is determined that an additional response is to be expected, then intermediary messaging system may wait for a period of time 1018 before receiving another response from the first and/or second target service at 1008 or 1010. If it is determined that no additional response is to be expected, then in some embodiments, the process ends.

As shown in FIG. 10 and described above, intermediary messaging system 208 enables multiple responses may be communicated to the client by transmitting a single backend request to multiple target services. For example, during the first iteration of process 1000, a first response may be transmitted to the client from in 1012 or 1014. During a second iteration of operations of 1018, 1008 and 1010, a second response may be received from the first and/or second target service at time T2, where T2 is after T1, with possible a delay of time between T1 and T2. During a third iteration of operations of 1018, 1008 and 1010, a third response may be received from the first and/or second target service at time T3, where T3 is after T2, with possible a delay of time between T2 and T3, and so on.

Figure 11:
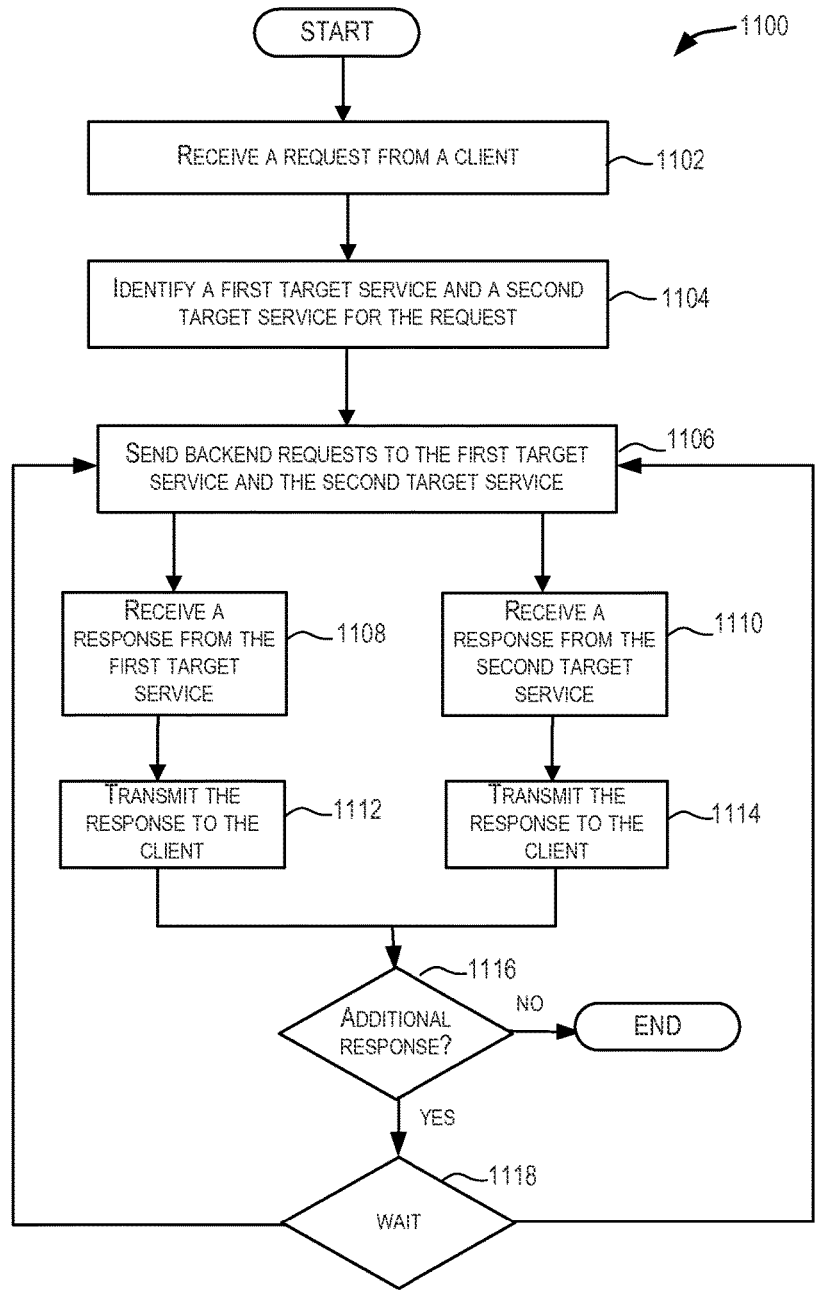
FIG. 11 illustrates a flow diagram of an example process 1100 for providing message delivery services for users of an organization, described herein.

FIG. 11 illustrates a flow diagram of an example process 1100 for providing message delivery services for users of an organization, described herein. The process at 1100 may begin at 1102 by receiving a request from a client. For instance, and as discussed above, the user may utilize an application on the client to generate a request. At 1104, the intermediary messaging system may identify a first target service and a second target service for servicing the request. At 1106, the intermediary messaging system may transmit backend requests to the first and second target services. At 1108, the intermediary messaging system may receive a response to the backend request from the first target service. At 1110, the intermediary messaging system may receive a response to the backend request from the second target service. The response from the second target service may be received in parallel to or after the response from the first target service. At 1112, the intermediary messaging system may transmit the response from the first target service to the client. At 1114, the intermediary messaging system may transmit the response from the second target service to the client.

At 1116, the intermediary messaging system determines if an additional response will be received from the first or second target service. As discussed above, various conditions may be utilized by the intermediary messaging system to determine whether an additional response is to be expected from the target services. If it is determined that an additional response is to be expected, then intermediary messaging system may wait for a period of time 1018 before transmitting another backend request to the first and/or the second target service and receiving another response from the first or second target service at 1108 or 1110. If it is determined that no additional response is to be expected, then in some embodiments, the process ends.

Thus, as shown in FIG. 11 and described above, intermediary messaging system 208 enables multiple responses may be communicated to the client by transmitting multiple backend requests to multiple target services. For example, during the first iteration of process 1100, a first response may be transmitted to the client from in 1112 or 1114. During a second iteration of operations of 1118, 1116, 1106 and 1108 or 1110, a second backend request may be transmitted to the first and/or second target service and a second response may be received from the first and/or second target service at time T2, where T2 is after T1, with possible a delay of time between T1 and T2. During a third iteration of operations of 1118, 1116, 1106 and 1108 or 1110, a third backend request may be transmitted to the first and/or second target service a third response may be received from the first and/or second target service at time T3, where T3 is after T2, with possible a delay of time between T2 and T3, and so on.

Figure 12:
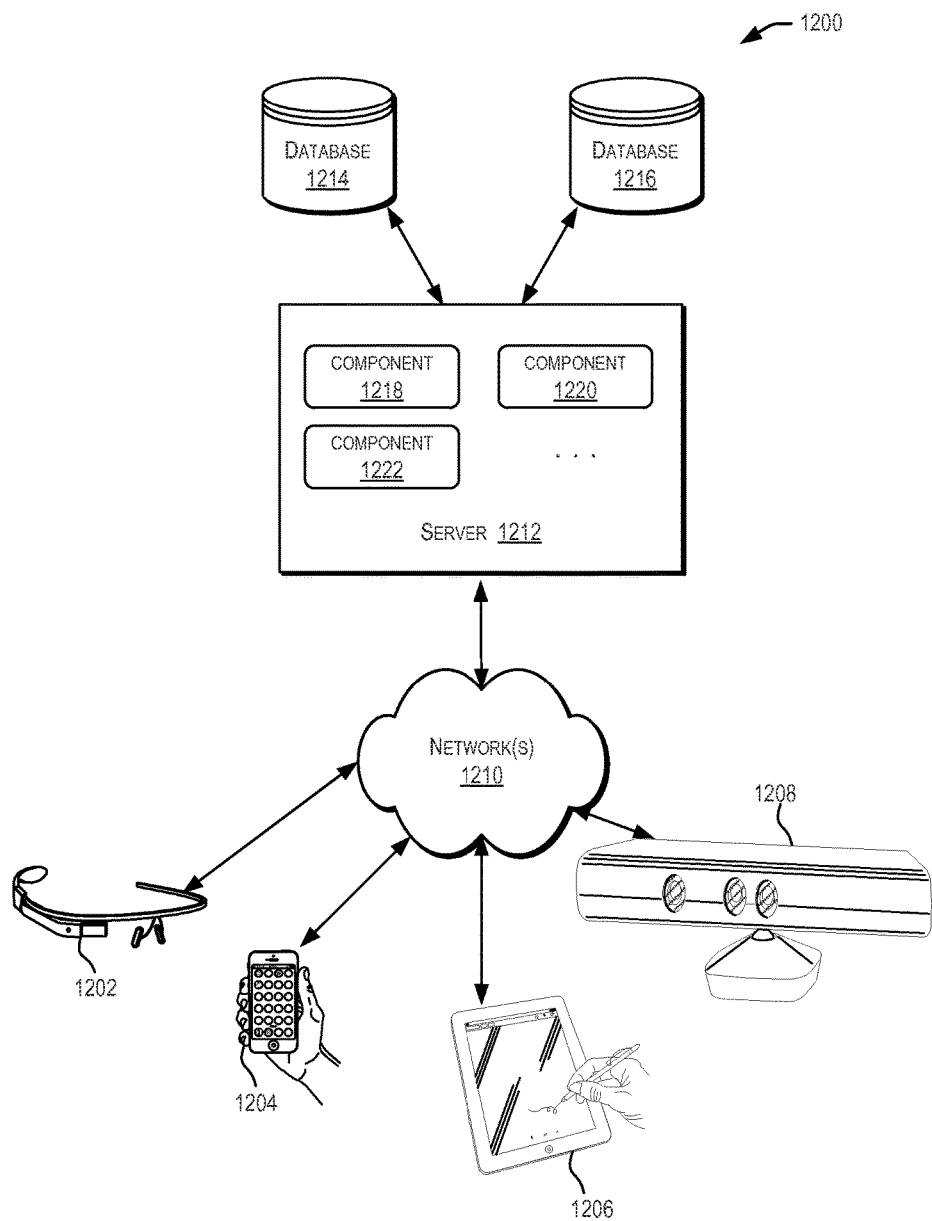
FIG. 12 depicts a simplified diagram of a distributed system 1200 for implementing an embodiment.

FIG. 12 depicts a simplified diagram of a distributed system 1200 for implementing an embodiment. In the illustrated embodiment, the distributed system 1200 includes one or more client computing devices 1202, 1204, 1206, and 1208, which are configured to execute and operate a client application such as a web browser, proprietary client (e.g., Oracle Forms), or the like over one or more network(s) 1210. The server 1212 may be communicatively coupled with the remote client computing devices 1202, 1204, 1206, and 1208 via network 1210.

In various embodiments, the server 1212 may be adapted to run one or more services or software applications such as services and applications that provide message delivery services. In certain embodiments, the server 1212 may also provide other services or software applications can include non-virtual and virtual environments. In some embodiments, these services may be offered as web-based or cloud services or under a Software as a Service (SaaS) model to the users of the client computing devices 1202, 1204, 1206, and/or 1208. Users operating the client computing devices 1202, 1204, 1206, and/or 1208 may in turn utilize one or more client applications to interact with the server 1212 to utilize the services provided by these components.

In the configuration depicted in FIG. 12, the software components 1218, 1220 and 1222 of system 1200 are shown as being implemented on the server 1212. In other embodiments, one or more of the components of the system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

The client computing devices 1202, 1204, 1206, and/or 1208 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1210.

Although distributed system 1200 in FIG. 12 is shown with four client computing devices, any number of client computing devices may be supported. Other devices, such as devices with sensors, etc., may interact with the server 1212.

The network(s) 1210 in the distributed system 1200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1210 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1212 can include one or more virtual machines running virtual operating systems, or other computing architectures involving virtualization. One or more flexible pools of logical storage devices can be virtualized to maintain virtual storage devices for the server. Virtual networks can be controlled by the server 1212 using software defined networking In various embodiments, the server 1212 may be adapted to run one or more services or software applications described in the foregoing disclosure. For example, the server 1212 may correspond to a server for performing processing as described above according to an embodiment of the present disclosure.

The server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 1212 may include one or more applications to analyze and consolidate data feeds and/or event updates received from users of the client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1212 may also include one or more applications to display the data feeds and/or real-time events via one or more display devices of the client computing devices 1202, 1204, 1206, and 1208.

The distributed system 1200 may also include one or more databases 1214 and 1216. These databases may provide a mechanism for storing information such as inventory information, and other information used by embodiments of the present invention. Databases 1214 and 1216 may reside in a variety of locations. By way of example, one or more of databases 1214 and 1216 may reside on a non-transitory storage medium local to (and/or resident in) the server 1212. Alternatively, the databases 1214 and 1216 may be remote from the server 1212 and in communication with the server 1212 via a network-based or dedicated connection. In one set of embodiments, the databases 1214 and 1216 may reside in a storage-area network (SAN). Similarly, any necessary files for performing the functions attributed to the server 1212 may be stored locally on the server 1212 and/or remotely, as appropriate. In one set of embodiments, the databases 1214 and 1216 may include relational databases, such as databases provided by Oracle, that are adapted to store, update, and retrieve data in response to SQL-formatted commands.

Figure 13:
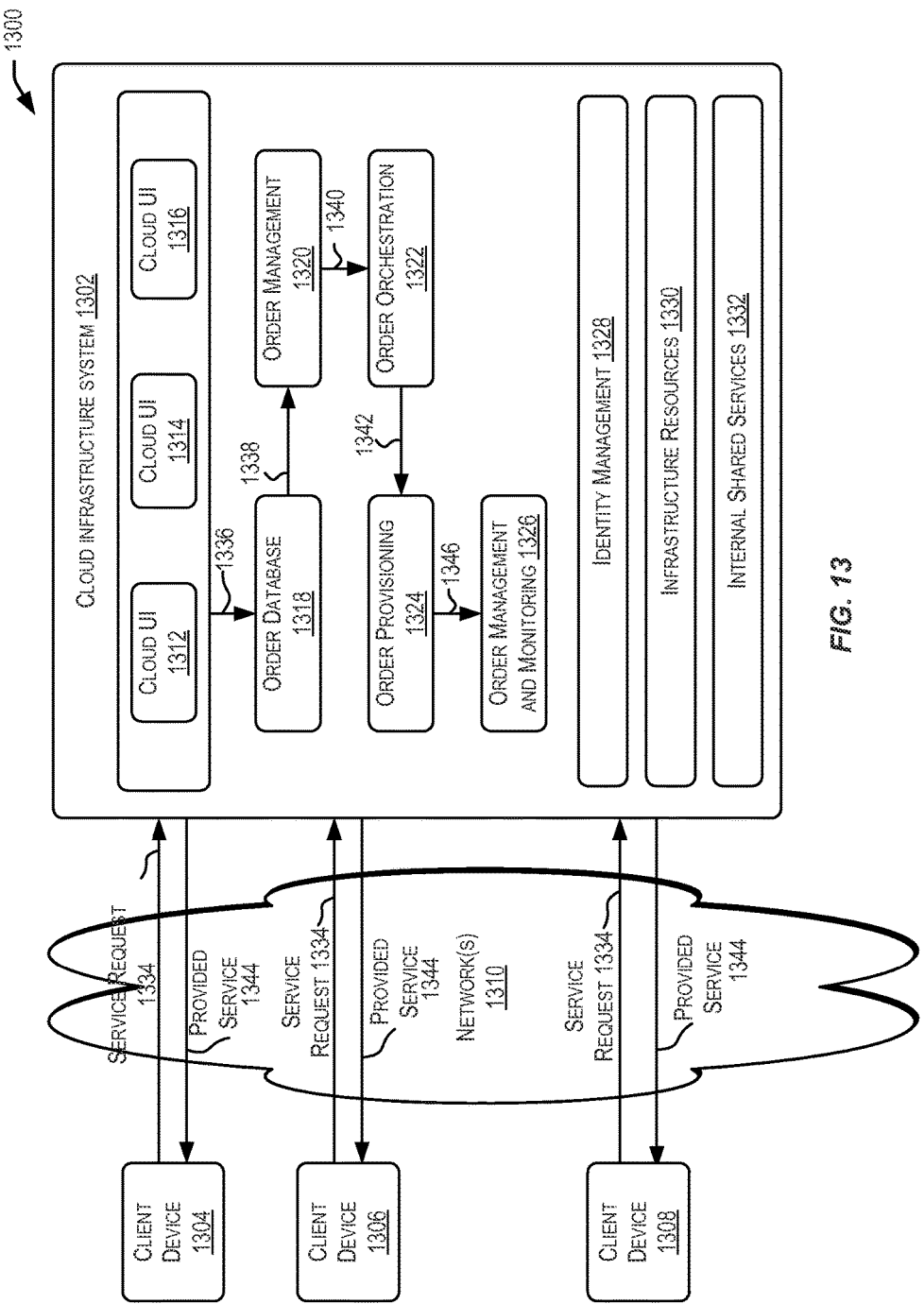
FIG. 13 is a simplified block diagram of one or more components of a system environment 1300 in which services may be offered as cloud services, in accordance with an embodiment of the present disclosure.

In some embodiments, the message delivery services described above may be offered as services via a cloud environment. FIG. 13 is a simplified block diagram of one or more components of a system environment 1300 in which services may be offered as cloud services, in accordance with an embodiment of the present disclosure. In the illustrated embodiment in FIG. 13, system environment 1300 includes one or more client computing devices 1304, 1306, and 1308 that may be used by users to interact with a cloud infrastructure system 1302 that provides cloud services, including services for dynamically modifying documents (e.g., webpages) responsive to usage patterns. Cloud infrastructure system 1302 may comprise one or more computers and/or servers that may include those described above for server 1212.

It should be appreciated that cloud infrastructure system 1302 depicted in FIG. 13 may have other components than those depicted. Further, the embodiment shown in FIG. 13 is only one example of a cloud infrastructure system that may incorporate an embodiment of the invention. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208. Client computing devices 1304, 1306, and 1308 may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302. Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1210.

In certain embodiments, services provided by cloud infrastructure system 1302 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1302 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1302 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle Corporation) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1302 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1302 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform, and other resources.

In some embodiments, resources in cloud infrastructure system 1302 may be shared by multiple users and dynamically re-allocated per demand. Additionally, resources may be allocated to users in different time zones. For example, cloud infrastructure system 1302 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 to enable provision of services by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in FIG. 13, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In an exemplary operation, at 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI) such as cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

At 1336, the order information received from the customer may be stored in an order database 1318. If this is a new order, a new record may be created for the order. In one embodiment, order database 1318 can be one of several databases operated by cloud infrastructure system 1318 and operated in conjunction with other system elements.

At 1338, the order information may be forwarded to an order management module 1320 that may be configured to perform billing and accounting functions related to the order, such as verifying the order, and upon verification, booking the order.

At 1340, information regarding the order may be communicated to an order orchestration module 1322 that is configured to orchestrate the provisioning of services and resources for the order placed by the customer. In some instances, order orchestration module 1322 may use the services of order provisioning module 1324 for the provisioning. In certain embodiments, order orchestration module 1322 enables the management of business processes associated with each order and applies business logic to determine whether an order should proceed to provisioning.

As shown in the embodiment depicted in FIG. 13, at 1342, upon receiving an order for a new subscription, order orchestration module 1322 sends a request to order provisioning module 1324 to allocate resources and configure resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. This enables order orchestration module 1324 to be isolated from implementation details, such as whether or not services and resources are actually provisioned on the fly or pre-provisioned and only allocated/assigned upon request.

At 1344, once the services and resources are provisioned, a notification may be sent to the subscribing customers indicating that the requested service is now ready for use. In some instance, information (e.g. a link) may be sent to the customer that enables the customer to start using the requested services.

At 1346, a customer's subscription order may be managed and tracked by an order management and monitoring module 1326. In some instances, order management and monitoring module 1326 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1300 may include an identity management module 1328 that is configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Figure 14:
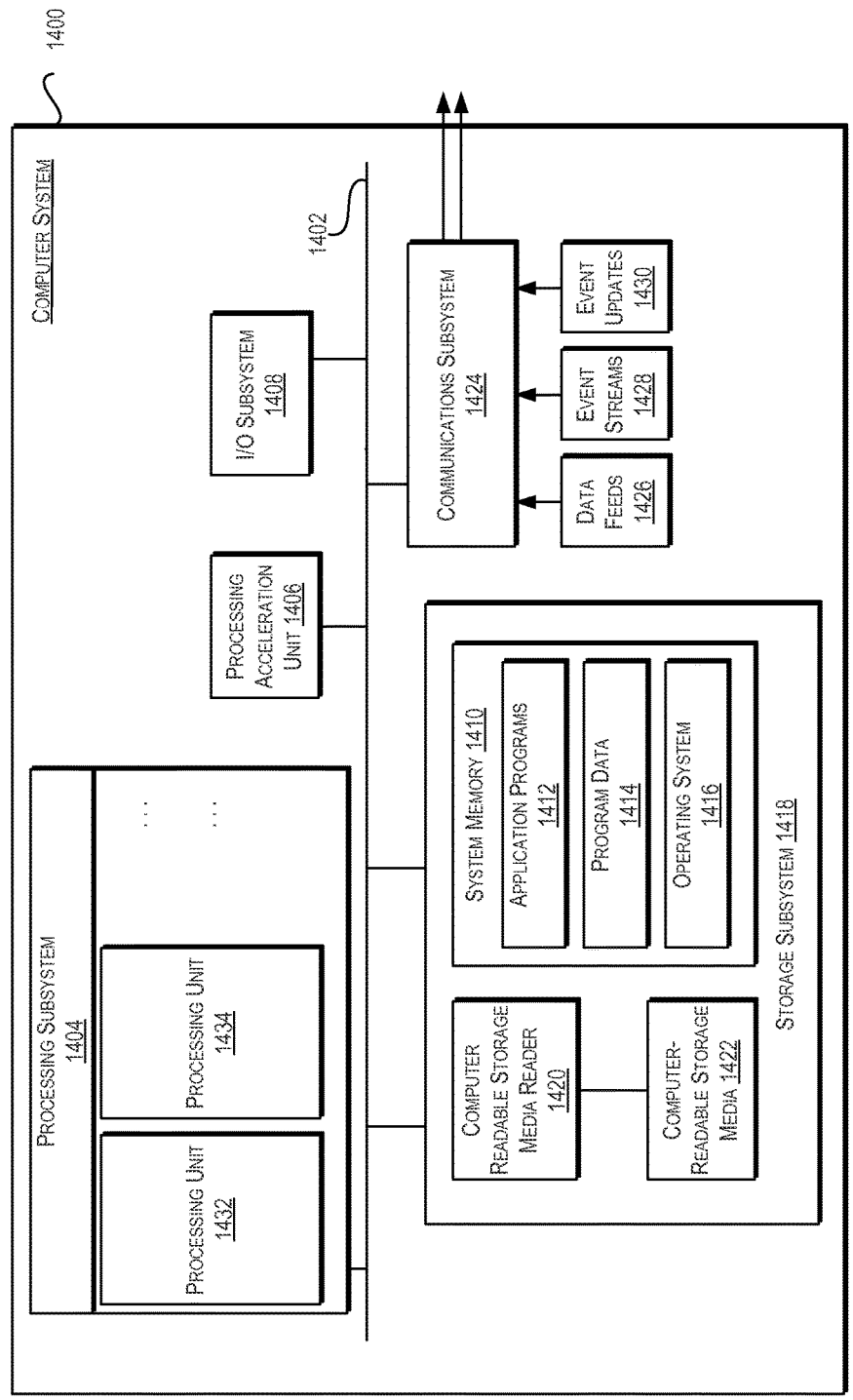
FIG. 14 illustrates an exemplary computer system 1400 that may be used to implement an embodiment of the present invention.

FIG. 14 illustrates an exemplary computer system 1400 that may be used to implement an embodiment of the present invention. In some embodiments, computer system 1400 may be used to implement any of the various servers and computer systems described above. As shown in FIG. 14, computer system 1400 includes various subsystems including a processing subsystem 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 may include tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1404 controls the operation of computer system 1400 and may comprise one or more processing units 1432, 1434, etc. A processing unit may include be one or more processors, including single core or multicore processors, one or more cores of processors, or combinations thereof. In some embodiments, processing subsystem 1404 can include one or more special purpose co-processors such as graphics processors, digital signal processors (DSPs), or the like. In some embodiments, some or all of the processing units of processing subsystem 1404 can be implemented using customized circuits, such as application specific integrated circuits (ASICs), or field programmable gate arrays (FPGAs).

In some embodiments, the processing units in processing subsystem 1404 can execute instructions stored in system memory 1410 or on computer readable storage media 1422. In various embodiments, the processing units can execute a variety of programs or code instructions and can maintain multiple concurrently executing programs or processes. At any given time, some or all of the program code to be executed can be resident in system memory 1410 and/or on computer-readable storage media 1410 including potentially on one or more storage devices. Through suitable programming, processing subsystem 1404 can provide various functionalities described above for dynamically modifying documents (e.g., webpages) responsive to usage patterns.

In certain embodiments, a processing acceleration unit 1406 may be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term "input device" is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information that is used by computer system 1400. Storage subsystem 1418 provides a tangible non-transitory computer-readable storage medium for storing the basic programming and data constructs that provide the functionality of some embodiments. Software (programs, code modules, instructions) that when executed by processing subsystem 1404 provide the functionality described above may be stored in storage subsystem 1418. The software may be executed by one or more processing units of processing subsystem 1404. Storage subsystem 1418 may also provide a repository for storing data used in accordance with the present invention.

Storage subsystem 1418 may include one or more non-transitory memory devices, including volatile and non-volatile memory devices. As shown in FIG. 14, storage subsystem 1418 includes a system memory 1410 and a computer-readable storage media 1422. System memory 1410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by processing subsystem 1404. In some implementations, system memory 1410 may include multiple different types of memory, such as static random access memory (SRAM) or dynamic random access memory (DRAM).

By way of example, and not limitation, as depicted in FIG. 14, system memory 1410 may store application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1422 may store programming and data constructs that provide the functionality of some embodiments. Software (programs, code modules, instructions) that when executed by processing subsystem 1404 a processor provide the functionality described above may be stored in storage subsystem 1418. By way of example, computer-readable storage media 1422 may include non-volatile memory such as a hard disk drive, a magnetic disk drive, an optical disk drive such as a CD ROM, DVD, a Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1422 may provide storage of computer-readable instructions, data structures, program modules, and other data for computer system 1400.

In certain embodiments, storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for storing computer-readable information.

In certain embodiments, computer system 1400 may provide support for executing one or more virtual machines. Computer system 1400 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1400. Accordingly, multiple operating systems may potentially be run concurrently by computer system 1400. Each virtual machine generally runs independently of the other virtual machines.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client devices via the Internet for receiving and sending information from and to the client devices.

Communication subsystem 1424 may support both wired and/or wireless communication protocols. For example, in certain embodiments, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

Communication subsystem 1424 can receive and transmit data in various forms. For example, in some embodiments, communications subsystem 1424 may receive input communication in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A computer-implemented method comprising:
receiving, by a computer system, a single request from a client, wherein the computer system is an intermediary messaging system that is configured to establish a Websocket connection with the client, and wherein the single request is translated to multiple requests sent to a set of one or more target services;
identifying, by the computer system, the set of one or more target services for the single request;
translating, by the intermediary messaging system, the single request to multiple requests for the set of one or more target services;
sending, by the computer system, the single request to the identified set of one or more target services;
receiving, by the computer system, at a first time, a first response of a plurality of received responses to the single request from the set of one or more target services;
upon receipt of the first response, transmitting, by the computer system, the first response to the client;
receiving, by the computer system, at a second time, a second response of the plurality of received responses to the single request from the set of one or more target services, the second time being after the first time and after the first response has been transmitted to the client; and
upon receipt of the second response, transmitting, after the first response has been transmitted to the client, the second response to the client,
wherein the intermediary messaging system is configured to receive multiple responses from the set of one or more target services that are periodically sent back to the client, and wherein the multiple responses include requested information, and wherein the requested information is updated and displayed with each response received from the set of one or more target services.

2. The computer-implemented method of claim 1, further comprising:
  determining, by the computer system, whether a session of an application executing on the client has ended; and
  in response to determining that the session has not ended, waiting, by the computer system, for a third response to the single request to be received from the set of one or more target services.

3. The computer-implemented method of claim 1, wherein the first response is received from a first target service in the set of one or more target services and the second response is received from a second target service in the set of one or more target services, the second target service being different from the first target service.

4. The computer-implemented method of claim 3 further comprising:
  receiving, by the computer system, at a third time, a third response to the request from the first target service, the third time being different from and after the first time; and
  transmitting, by the computer system, the third response to the client.

5. The method of claim 4 further comprising:
  receiving, by the computer system, at a fourth time, a fourth response to the request from the second target service, the fourth time being different from and after the second time; and
  transmitting, after the second response has been transmitted to the client, the fourth response to the client.

6. The computer-implemented method of claim 4 further comprising:
  transmitting, by the computer system, a first backend request to the first target service; and
  wherein receiving the first response comprises receiving the first response in response to the first backend request; and
  wherein receiving the third response comprises receiving the third response in response to the first backend request.

7. The computer-implemented method of claim 1, wherein the first response and the second response are received from a same target service in the set of one or more target services.

8. The computer-implemented method of claim 1, further comprising establishing a connection using a Websocket protocol between the client and the computer system; and
  wherein receiving the request from the client comprises receiving the request using the connection;
  wherein transmitting the first response to the client comprises transmitting the first response using the connection; and
  wherein transmitting the second response to the client comprises transmitting the second response using the connection.

9. The computer-implemented method of claim 1 further comprising:
  transmitting, by the computer system, a first backend request to a first target service of the set of one or more target services; and
  wherein receiving the first response comprises receiving the first response in response to the first backend request;
  transmitting, by the computer system, after receiving the first response, a second backend request to the first target service;
  wherein receiving the second response comprises receiving the second response in response to the second backend request.

10. The computer-implemented method of claim 1, further comprising:
  receiving, by a pipeline component of the computer system, the request from the client, the pipeline component configured to specify at least one of a request path or a response path for the request;
  transmitting, by the pipeline component, the request to a service interface of the computer system;
  identifying, by the service interface, a first target service of the set of one or more target services for servicing the request;
  transmitting, by the service interface, the request to the first target service;
  receiving, by the service interface, a first response to the request from the first target service;
  transmitting, by the service interface, the first response to the client;
  receiving, by the service interface, at the second time, the second response to the request from the first target service, the second time being after the first time and after the first response has been transmitted to the client; and
  transmitting, by the service interface, after the first response has been transmitted to the client, the second response to the pipeline component; and
  transmitting, by the pipeline component, the second response to the client.

11. The method according to claim 1, further comprising:
executing a session of an application on the client; and
transmitting subsequent responses to the client until the session of the application executing on the client has ended.

12. An intermediary messaging system comprising:
a processor; and
a memory device including instructions that, when executed by a processor, cause the processor to:
receive a single request from a client, wherein the intermediary messaging system is configured to establish a Websocket connection with the client, and wherein the single request is translated to multiple requests sent to a set of one or more target services;
identify the set of one or more target services for the single request;
translating, by the intermediary messaging system, the single request to multiple requests for the set of one or more target services;
sending, by the intermediary messaging system, the single request to the identified set of one or more target services;
receive at a first time, a first response of a plurality of received responses to the single request from the set of one or more target services;
upon receipt of the first response, transmit the first response to the client;
receive at a second time, a second response of the plurality of received responses to the single request from the set of one or more target services, the second time being after the first time and after the first response has been transmitted to the client; and
upon receipt of the second response, transmit after the first response has been transmitted to the client, the second response to the client,
wherein the intermediary messaging system is configured to receive multiple responses from the set of one or more target services that are periodically sent back to the client, and wherein the multiple responses include requested information, and wherein the requested information is updated and displayed with each response received from the set of one or more target services.

13. The system of claim 12, wherein the processor is further configured to:
    determine whether a session of an application executing on the client has ended; and
    in response to determining that the session has not ended, wait, for a third response to the request to be received from the set of one or more target services.

14. The system of claim 12, wherein the first response is received from a first target service in the set of one or more target services and the second response is received from a second target service in the set of one or more target services, the second target service being different from the first target service.

15. The system of claim 14, wherein the processor is further configured to:
    receive at a third time, a third response to the request from the first target service, the third time being different from and after the first time; and
    transmit the third response to the client.

16. The system of claim 15, wherein the processor is further configured to:
    transmit a first backend request to the first target service; and
    wherein the instructions to receive the first response comprises instructions to receive the first response in response to the first backend request; and
    wherein the instructions to receive the third response comprises instructions to receive the third response in response to the first backend request.

17. The system of claim 14, wherein the processor is further configured to:
    transmit a first backend request to the first target service of the set of one or more target services; and
    wherein the instructions to receive the first response comprises instructions to receive the first response in response to the first backend request;
    transmit after the instructions to receive the first response, a second backend request to the first target service;
    wherein the instructions to receive the second response comprises instructions to receive the second response in response to the second backend request.

18. A non-transitory computer-readable media storing computer-executable instructions executable by one or more processors, the computer-executable instructions comprising:
    instructions that cause the one or more processors to receive a single request from a client, wherein the one or more processors is an intermediary messaging system that is configured to establish a Websocket connection with the client, and wherein the single request is translated to multiple requests sent to a set of one or more target services;
    instructions that cause the one or more processors to identify the set of one or more target services for the single request;
    instructions that cause the one or more processors to translate, by the intermediary messaging system, the single request to multiple requests for the set of one or more target services;
    instructions that cause the one or more processors to send, by the intermediary messaging system, the single request to the identified set of one or more target services;
    instructions that cause the one or more processors to receive at a first time, a first response of a plurality of received responses to the single request from the set of one or more target services;
    instructions that cause the one or more processors to, upon receipt of the first response, transmit the first response to the client;
    instructions that cause the one or more processors to receive at a second time, a second response of the plurality of received responses to the single request from the set of one or more target services, the second time being after the first time and after the first response has been transmitted to the client; and instructions that cause the one or more processors to, upon receipt of the second response, transmit after the first response has been transmitted to the client, the second response to the client,
    wherein the intermediary messaging system is configured to receive multiple responses from the set of one or more target services that are periodically sent back to the client, and wherein the multiple responses include requested information, and wherein the requested information is updated and displayed with each response received from the set of one or more target services.

19. The computer-readable media of claim 18, the instructions further comprising instructions that cause the one or more processors to:
    determine whether a session of an application executing on the client has ended; and
    in response to the instructions to determine that the session has not ended, instructions to wait for a third response to the request to be received from the set of one or more target services.

20. The computer-readable media of claim 18, wherein the first response is received from a first target service in the set of one or more target services and the second response is received from a second target service in the set of one or more target services, the second target service being different from the first target service.

21. The computer-readable media of claim 20, the instructions further comprising instructions that cause the one or more processors to:
    receive a third response to the request from the first target service at a third time, the third time being different from and after the first time; and
    transmit the third response to the client.

* * * * *

UNITED STATES PATENT AND TRADEMARK OFFICE
CERTIFICATE OF CORRECTION

PATENT NO. : 10,015,120 B2
APPLICATION NO. : 14/668448
DATED : July 3, 2018
INVENTOR(S) : Misra et al.

Page 1 of 1

It is certified that error appears in the above-identified patent and that said Letters Patent is hereby corrected as shown below:

In the Specification

In Column 17, Line 66, delete "networking" and insert -- networking. --, therefor.

Signed and Sealed this
Ninth Day of April, 2019

Andrei Iancu
*Director of the United States Patent and Trademark Office*